UNITED STATES PATENT OFFICE.

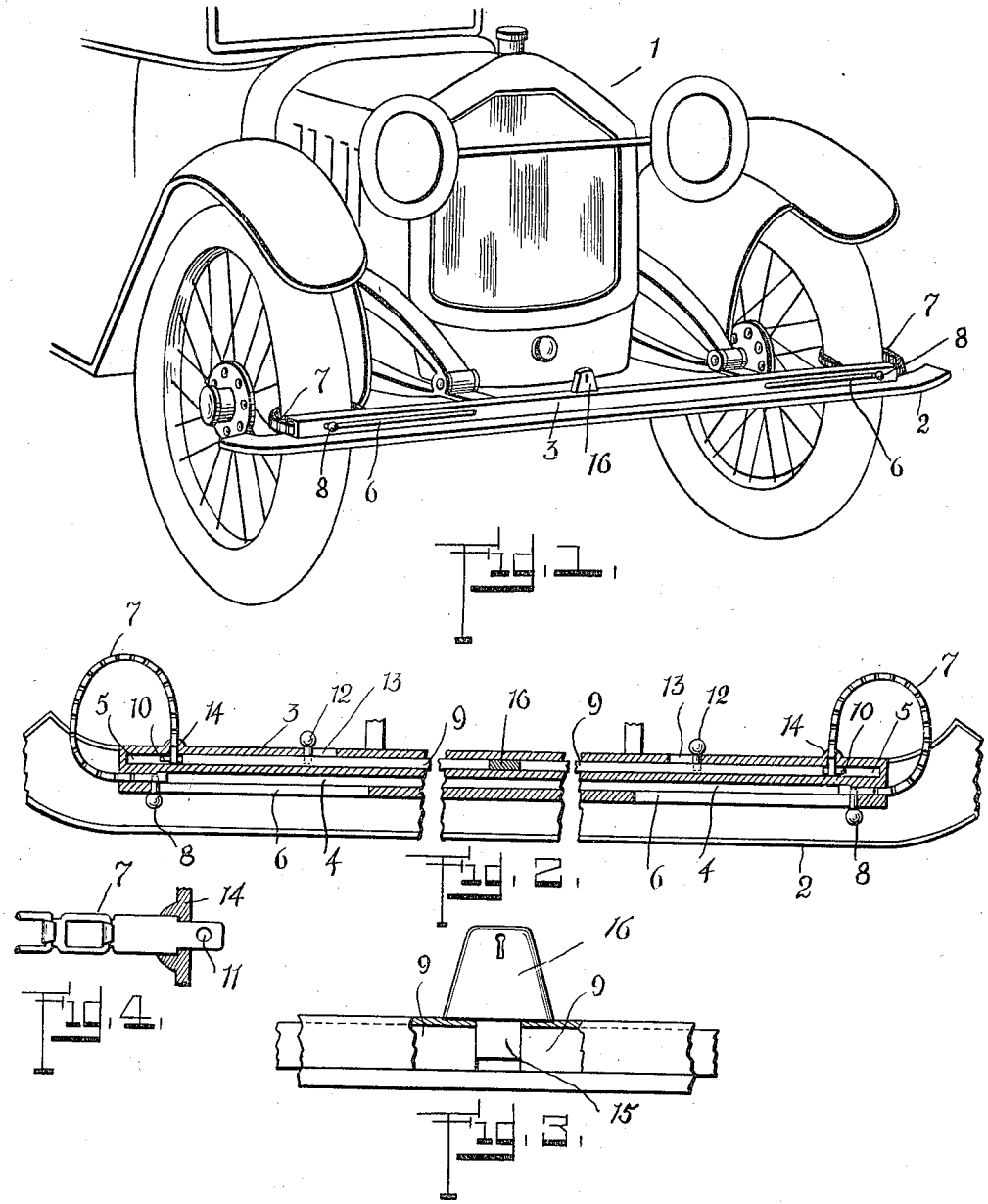

OTTO TIEDEMANN, OF DALLAS, TEXAS, ASSIGNOR OF ONE-HALF TO WALTER D. SHARTS, OF DALLAS, TEXAS.

AUTOMOBILE-LOCK.

1,320,588. Specification of Letters Patent. Patented Nov. 4, 1919.

Application filed November 12, 1918. Serial No. 262,164.

*To all whom it may concern:*

Be it known that I, OTTO TIEDEMANN, a citizen of the United States, residing at Dallas, in the county of Dallas and State of Texas, have invented certain new and useful Improvements in Automobile-Locks, of which the following is a specification.

My invention relates to improvements in automobile locks and in such connection it relates to the construction and arrangement of such a lock.

The principal object of my invention is to provide an automobile lock adapted to fit on or form part of the bumper of the automobile and constructed and arranged so that either or both of the front wheels may be locked.

Another object of the invention is the provision of an automobile lock which is strong, durable, and not expensive to manufacture.

My invention, briefly stated, consists of a hollow frame wherein two bolts each slightly less than one half of the length of the frame are arranged to slide. Two chains in the frame for encircling the rim and tire of the front wheels of the automobile are arranged to slide in and out, each chain after being placed around the wheel being inserted in a slot in the frame and locked by a bolt. Each frame is provided with means for sliding the bolts in the bumper frame and a lock to engage or disengage the bolt is arranged so as to project its bolt between the adjacent inner ends of the sliding bolts to hold them in extended locking position when the wheels are locked by the chains.

My invention will be more fully understood from the following description, taken in connection with the accompanying drawings, forming part hereof, in which—

Figure 1 is a perspective view of the front end of an automobile embodying my invention.

Fig. 2 is a top view of the bumper, the locking arrangement shown in longitudinal section.

Fig. 3 is a detail sectional view of the locking bars and lock, and

Fig. 4 is a detail view of a section of the chain, etc.

Referring more particularly to the drawings, the automobile 1 has a bumper 2 and my lock may either be made to fit on or made a part of the bumper. The frame 3 of the lock has two longitudinal channels 4 and 5, the channel 4 running the entire length of the frame body and has two transverse slots 6—6. Each end of the channel 4 is adapted to receive a chain 7 the chain being pulled in and out of the channel 4 by a small knob or knobs 8 guided in slots 6—6 when it is desired to lock or unlock the wheels.

In the channel 5 two bolts 9—9 are arranged to slide the forward end of each bolt having a small locking finger 10. When the wheels are to be locked the chains 7 are pulled out of the channel 4 by the knobs 8 and placed around the wheels as shown in Fig. 1, and the ends of the chains are inserted in bosses 14 and extended into the channel 5. The bars 9 are then slid forward by the knobs 12 in slots 13 in the channel 5 and the fingers 10 are forced through a small hole 11 in the chains 7. When in this position they are then locked in place by a bolt 15 of a small lock 16 operated by a key, the bolt 15 pushing the bars 9 apart and forcing the fingers 10 through the chains 7. While the lock 14 is shown on the top of the frame it may be placed at the back or on any suitable part of the device.

Having thus described the nature and objects of my invention, what I claim as new and desire to secure by Letters Patent, is—

1. In an automobile lock, a channeled frame, two relatively long sliding bolts arranged to slide in the frame, two chains carried in the frame and adapted to be extended therefrom to engage a wheel, the free end of the chains adapted to enter the channeled frame and to be locked against removal therefrom by the bolts, said chains when not in use entirely inclosed by the frame.

2. In an automatic lock, a channeled bumper frame, two relatively long sliding bolts working in opposite directions in said frame, two chains carried in the frame and each adapted to be extended beyond an end of the frame to engage a wheel, each chain having a free end adapted to traverse the frame and to be locked therein by a sliding bolt, said chains entirely inclosed by the frame when not in use, and a means for preventing the retraction of said bolts when extended to locking position.

In testimony whereof I have signed my name to this specification.

OTTO TIEDEMANN.

Copies of this patent may be obtained for five cents each, by addressing the "Commissioner of Patents, Washington, D. C."